(12) United States Patent
Konishi

(10) Patent No.: US 7,164,446 B2
(45) Date of Patent: Jan. 16, 2007

(54) DIGITAL CAMERA AND METHOD OF CONTROLLING THE SAME

(75) Inventor: Masahiro Konishi, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 811 days.

(21) Appl. No.: 09/736,208

(22) Filed: Dec. 15, 2000

(65) Prior Publication Data

US 2001/0004271 A1 Jun. 21, 2001

(30) Foreign Application Priority Data

Dec. 15, 1999 (JP) ............................... 11-355568

(51) Int. Cl.
*H04N 5/232* (2006.01)
*H04N 5/222* (2006.01)

(52) U.S. Cl. ...................................... 348/349; 348/370

(58) Field of Classification Search ........ 348/370–371, 348/345–349, 357, 208.1, 139–140
See application file for complete search history.

(56) References Cited

U.S. PATENT DOCUMENTS 6,097,430 A * 8/2000 Komiya et al. .......... 348/218.1

6,757,013 B1 * 6/2004 Matsuzaka ............... 348/240.1
2003/0133021 A1 * 7/2003 Hamamura et al. ...... 348/229.1

FOREIGN PATENT DOCUMENTS

| JP | 64-61175 | 3/1989 |
| JP | 3-98034 | 4/1991 |
| JP | 3-126383 | 5/1991 |

* cited by examiner

*Primary Examiner*—David Ometz
*Assistant Examiner*—Kelly Jerabek
(74) *Attorney, Agent, or Firm*—Birch, Stewart, Kolasch & Birch, LLP

(57) ABSTRACT

The present invention is directed to obtaining an image having predetermined brightness, while making the degradation of the image as little as possible. A distance (an irradiation distance d) at which a predetermined amount of reflected light can be obtained is obtained from the guide number Gn of a strobe and the f-stop value F (the focal distance f of a zoom lens). When the strobe is used, it is judged whether or not a subject is positioned within the irradiation distance d. When the irradiation distance d of the strobe is shorter than the distance to the subject, that is, the subject is beyond the irradiation distance d of the strobe, an imaging signal is amplified than usual.

6 Claims, 6 Drawing Sheets

DIGITAL CAMERA AND METHOD OF CONTROLLING THE SAME

BACKGROUND OF THE INVENTION

1. Field of the Invention

The present invention relates to a digital camera and a method of controlling the same.

2. Description of the Background Art

In digital cameras having a zoom lens, the focal distance of the zoom lens can be continuously changed by moving the zoom lens. When the focal distance is increased, an image formed on an imaging surface is made large, thereby obtaining a telephotographic effect. When the focal distance is decreased, the image formed on the imaging surface is made small, thereby making wide-angle imaging possible.

A single-lens reflex camera, for example, of cameras having a zoom lens can employ such a lens structure that the f-stop value of the zoom lens is not changed even if the focal distance thereof is changed. However, a small-sized camera having a zoom lens employs such a lens structure that the f-stop value of the zoom lens is increased if the focal distance thereof is increased because it is generally difficult to employ such a lens structure that the f-stop value of the zoom lens is not changed even if the focal distance thereof is changed. In the small-sized camera, therefore, a subject image obtained in a state where the focal distance is long is liable to be darker, as compared with a subject image obtained in a state where the focal distance is short. That is, the f-stop value is increased when the focal distance is increased. Therefore, a subject image obtained in a state where the focal distance is long is darker, as compared with a subject image obtained in a state where the focal distance is short.

As lighting for obtaining a subject image having sufficient brightness in an environment whose surroundings are dark, for example, a strobe using a xenon tube is typically used. Further, in the case of a digital camera, an image signal obtained by imaging a subject is amplified using an amplifier to brighten an obtained subject image. When in the small-sized digital camera having a zoom lens, the imaging signal is amplified depending on only the f-stop value and the focal distance of the zoom lens, however, the image signal may be amplified by the amplifier irrespective of the fact that sufficient brightness is obtained by only light from a strobe. The amplification of the image signal by the amplifier brightens the subject image and mixes noise components into the obtained image signal, to degrade the image quality. It is preferable that the image signal is unnecessarily amplified as little as possible by the amplifier.

SUMMARY OF THE INVENTION

The present invention provides a digital camera capable of obtaining image data representing a subject image having sufficient brightness as well as obtaining image data having as few noise components as possible mixed thereinto and a method of controlling the same.

A digital camera according to the present invention comprises imaging means (an imaging device) for imaging a subject and outputting an image signal representing a subject image obtained by the imaging; a zoom lens whose focal distance can be changed; distance measurement means (a distance measurement device) for measuring the distance to the subject; signal amplification means (an amplifier) for amplifying the image signal outputted from the imaging means; first judgment means for judging whether or not the irradiation (illuminating or lighting) distance of a strobe which is obtained on the basis of the f-stop value of the zoom lens is shorter than the distance to the subject which is measured by the distance measurement means; and amplification factor control means for increasing the amplification factor of the signal amplification means when the first judgment means judges that the irradiation distance of the strobe is shorter than the distance to the subject.

In a digital camera for focusing a subject image on a light receiving surface of a solid-state electronic imaging device by a zoom lens whose focal distance can be changed, outputting an image signal representing the subject image from the solid-state electronic imaging device, and amplifying the outputted image signal, a method of controlling the digital camera according to the present invention comprises the steps of measuring the distance to a subject; judging whether or not the irradiation distance of a strobe which is obtained on the basis of the f-stop value of the zoom lens is shorter than the measured distance to the subject; and increasing an amplification factor for amplifying the obtained image signal when it is judged that the irradiation distance of the strobe is shorter than the distance to the subject.

The relationship of $Gn = F \times d$ holds among the guide number Gn (a fixed value) of the strobe, the f-stop value F of the zoom lens, a distance d at which a predetermined amount of reflected light can be obtained by strobe light irradiated from the strobe (hereinafter referred to as a strobe irradiation distance d). The strobe irradiation distance (illuminating or lighting distance) d can be obtained on the basis of the guide number Gn of the strobe and the f-stop value F. Since the guide number Gn of the strobe is a fixed value, therefore, the strobe irradiation distance d is changed on the basis of the f-stop value F.

According to the present invention, when the strobe irradiation distance d obtained on the basis of the f-stop value F of the zoom lens is shorter than the distance to the subject, that is, when the subject is positioned beyond the strobe irradiation distance d, the amplification factor for amplifying the image signal representing the subject image obtained by the imaging is made higher than a normal amplification factor. The subject image is brightened by increasing the amplification factor. On the other hand, when the subject is positioned within the strobe irradiation distance d, the amplification factor is not increased. If the subject is positioned within the strobe irradiation distance d, a subject image having predetermined brightness (luminance) can be obtained by the strobe light irradiated from the strobe.

In a case where the subject is positioned at a distance at which a predetermined amount of reflected light cannot be obtained depending on the strobe light irradiated from the strobe and consequently, so that a subject image having predetermined brightness (luminance) cannot be obtained, as described above, according to the present invention, the amplification factor for amplifying the image signal is made higher than the normal amplification factor. A bright subject image can be thus obtained. Further, the image signal is not unnecessarily amplified, thereby making it possible to make the degradation of the image quality as little as possible.

Preferably, the digital camera further comprises second judgment means for judging whether or not the subject image represented by the image signal amplified by the signal amplification means whose amplification factor has been increased by the amplification factor control means satisfies predetermined brightness. The amplification factor control means further increases the amplification factor of the signal amplification means when the second judgment means judges that the subject image represented by the amplified image signal does not satisfy the predetermined brightness (luminance).

The second judgment means judges whether or not the subject image represented by the amplified image signal satisfies the predetermined brightness. When it is judged that the subject image does not satisfy the predetermined brightness, the amplification factor of the signal amplification means is further increased by the amplification factor control means. When the extent of increase in the amplification factor of the signal amplification means in a case where the first judgment means judges that the strobe irradiation distance is shorter than the distance to the subject is small, or when the extent of increase in the amplification factor is insufficient because the subject is positioned in the distance, it is possible to obtain a subject image satisfying predetermined brightness or having brightness close to the predetermined brightness.

The distance to the subject at which the predetermined brightness can be obtained is found on the basis of the strobe irradiation distance d and the amplification factor of the signal amplification means. The found distance may be used as the basis of judgment whether or not the subject image represented by the amplified imaging signal satisfies the predetermined brightness. When the subject is positioned beyond the found distance, the amplification factor is further increased, thereby obtaining a subject image satisfying predetermined brightness or having brightness close to the predetermined brightness.

Particularly a small-sized digital camera employs a lens structure having such a relationship that the f-stop value F of a zoom lens is increased when the focal distance f thereof is long between the f-stop value F and the focal distance f. The relationship between the focal distance f and the f-stop value F may be previously found by simulation. The strobe irradiation distance d can be obtained on the basis of the guide number Gn of the strobe and the focal distance f of the zoom lens. Consequently, the first judgment means in the digital camera may judge whether or not the strobe irradiation distance d which is obtained on the basis of the focal distance f of the zoom lens is shorter than the distance to the subject which is measured by the distance measurement means.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
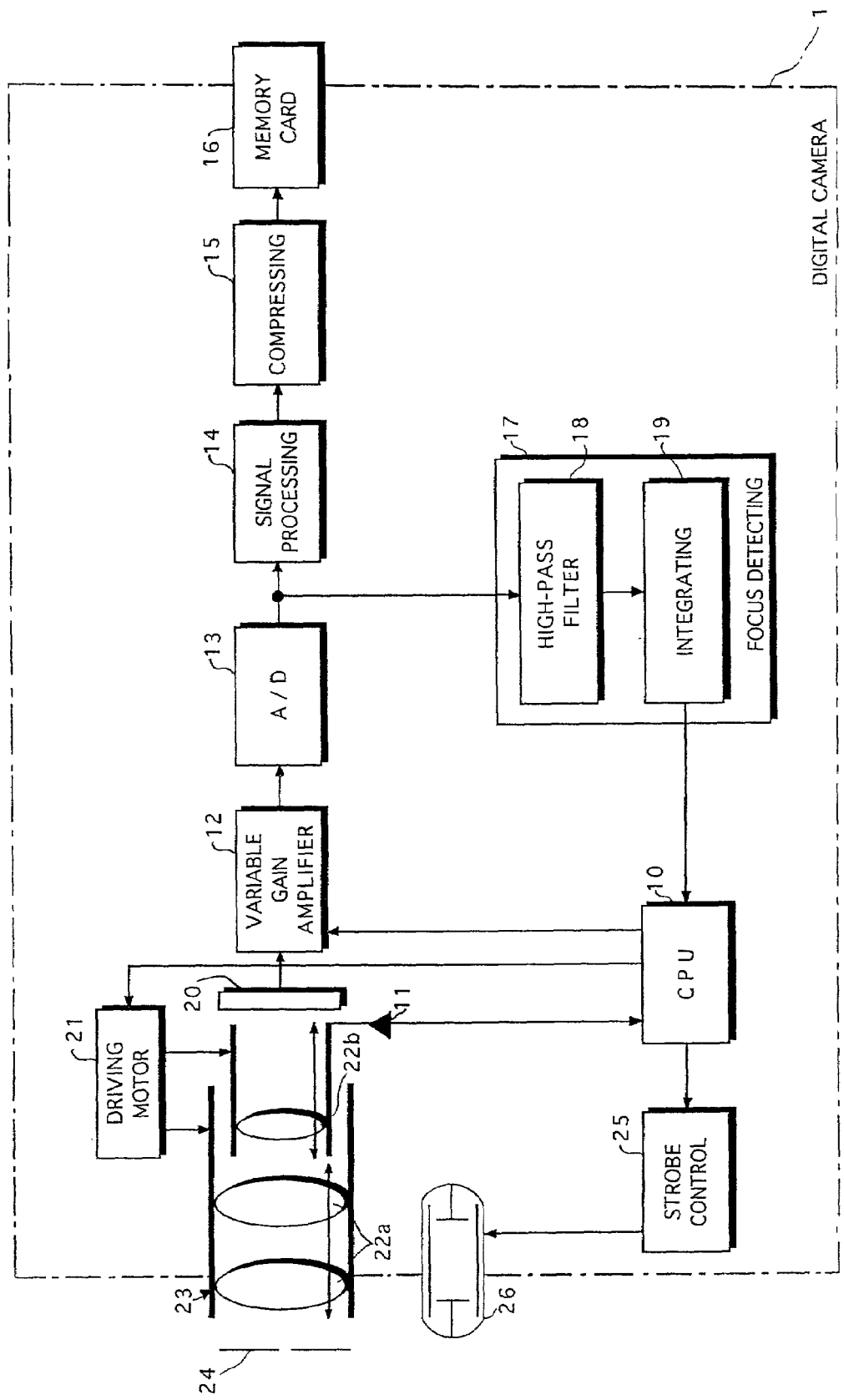
FIG. 1 is a block diagram showing the electrical configuration of a digital camera.
Figure 2:
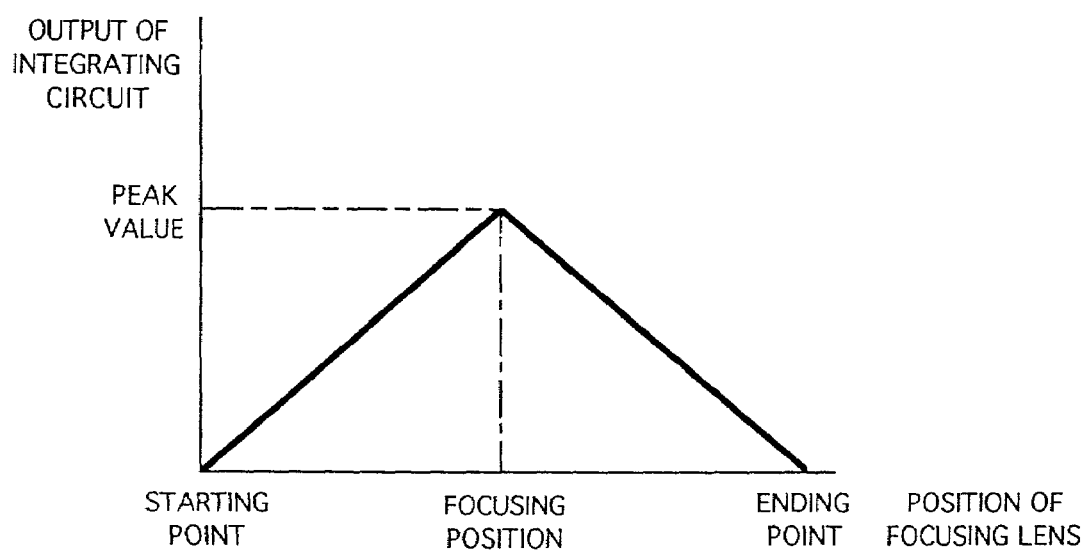
FIG. 2 is a graph showing the relationship between an output of an integrating circuit and the position of a focusing lens.

FIG. 1 is a block diagram showing the electrical configuration of a digital camera 1. FIG. 2 is a graph showing an example of the change of an output signal from an integrating circuit 19 contained in the digital camera 1.

The digital camera 1 comprises a CPU 10. The digital camera 1 is supervised and controlled by the CPU 10.

The digital camera 1 comprises an optical unit 23. The optical unit 23 has a group of lenses comprising a plurality of lenses. The group of lenses includes a zoom lens(es) 22a for zooming and a focusing lens 22b for focusing. The zoom lens 22a and the focusing lens 22b are moved by a driving motor(s) 21 controlled by a control instruction issued from the CPU 10.

Furthermore, the digital camera 1 includes an aperture (iris or diaphragm) 24 for adjusting the amount of light. The aperture 24 is controlled by the driving motor(s) 21.

The digital camera 1 further includes a starting point sensor 11. The focusing lens 22b is moved between a starting point on the side of a CCD 20 and an ending point on the front side of the digital camera 1. The starting point of the focusing lens 22b is detected by the starting point sensor 11.

When a power supply switch (not shown) is turned on, power is supplied to each of circuits in the digital camera 1. A subject image is formed on a light receiving surface of the CCD 20 through the zoom lens 22a and the focusing lens 22b, so that an analog image signal representing the subject image is outputted from the CCD 20.

The analog image signal outputted from the CCD 20 is amplified in a variable gain amplifying circuit (gain controllable amplifier) 12. The details of the operation of the variable gain amplifying circuit 12 will be described later.

The analog image signal outputted from the variable gain amplifying circuit 12 is inputted to an A/D (Analog-to-Digital) converter 13. In the A/D converter 13, the inputted analog image signal is converted into digital image data.

The digital image data outputted from the A/D converter 13 is inputted to a focus detecting circuit 17.

The focus detecting circuit 17 is a circuit for focusing. The focus detecting circuit 17 comprises a (digital) high-pass filter 18 and an (a digital) integrating circuit (integrator) 19.

In the high-pass filter 18, a high-frequency signal component is extracted from the digital image data outputted from the A/D converter 13. The high frequency signal component extracted from the digital image data in the high-pass filter 18 is inputted to the integrating circuit 19.

The integrating circuit 19 is a circuit for integrating input data for a predetermined time period. Output data of the integrating circuit 19 is fed to the CPU 10.

The level of the data outputted from the integrating circuit 19 is changed depending on the position of the focusing lens 22b. The focusing lens 22b is moved from the starting point to the ending point. As shown in FIG. 2, the level of the output data from the integrating circuit 19 gradually increases as the focusing lens 22b approaches a focusing position. When the focusing lens 22b reaches the focusing position, the level of the output data from the integrating circuit 19 reaches its peak value. When the focusing lens 22b is moved toward the ending point beyond the focusing position, the level of the output data from the integrating circuit 19 gradually decreases.

The position of the focusing lens 22b at which the peak value of the level of the output data from the integrating circuit 19 is obtained is detected by the CPU 10. The driving motor 21 is controlled by the CPU 10, so that the focusing lens 22b is put at the position where the level of the output data from the integrating circuit 19 reaches the peak value (this is the focusing position). The focusing is thus achieved, so that a subject image which is not blurred is formed on an imaging surface of the CCD 20.

Furthermore, the distance between the digital camera 1 and the subject is calculated in the CPU 10 on the basis of the position of the focusing lens 22b at which the peak value of the level of the output data from the integrating circuit 19 is obtained.

When digital image data representing the subject image obtained by the imaging is recorded on the memory card 16, a shutter release button (not shown) is depressed. The shutter release button is of such a type that it can be depressed in two stages. Processing such as the above-mentioned focusing, the calculation of the distance to the subject, and the measurement of the brightness is performed by the depression in the first stage, while the subject is imaged by the depression in the second stage.

When the shutter release button is depressed to the second stage, image data corresponding to one frame which has been outputted from the A/D converter 13 is inputted to a (digital) signal processing circuit 14. In the signal processing circuit 14, YC processing for generating luminance data and color difference data from the image data and other digital signal processing are performed. The image data which has been subjected to the signal processing in the signal processing circuit 14 is inputted to a compressing circuit 15, and is recorded on the memory card 16 after being compressed.

The digital camera 1 further comprises a strobe control circuit 25 and a strobe (device) 26. The details of the operations of the strobe control circuit 25 and the strobe 26 will be described later.

Figure 3:
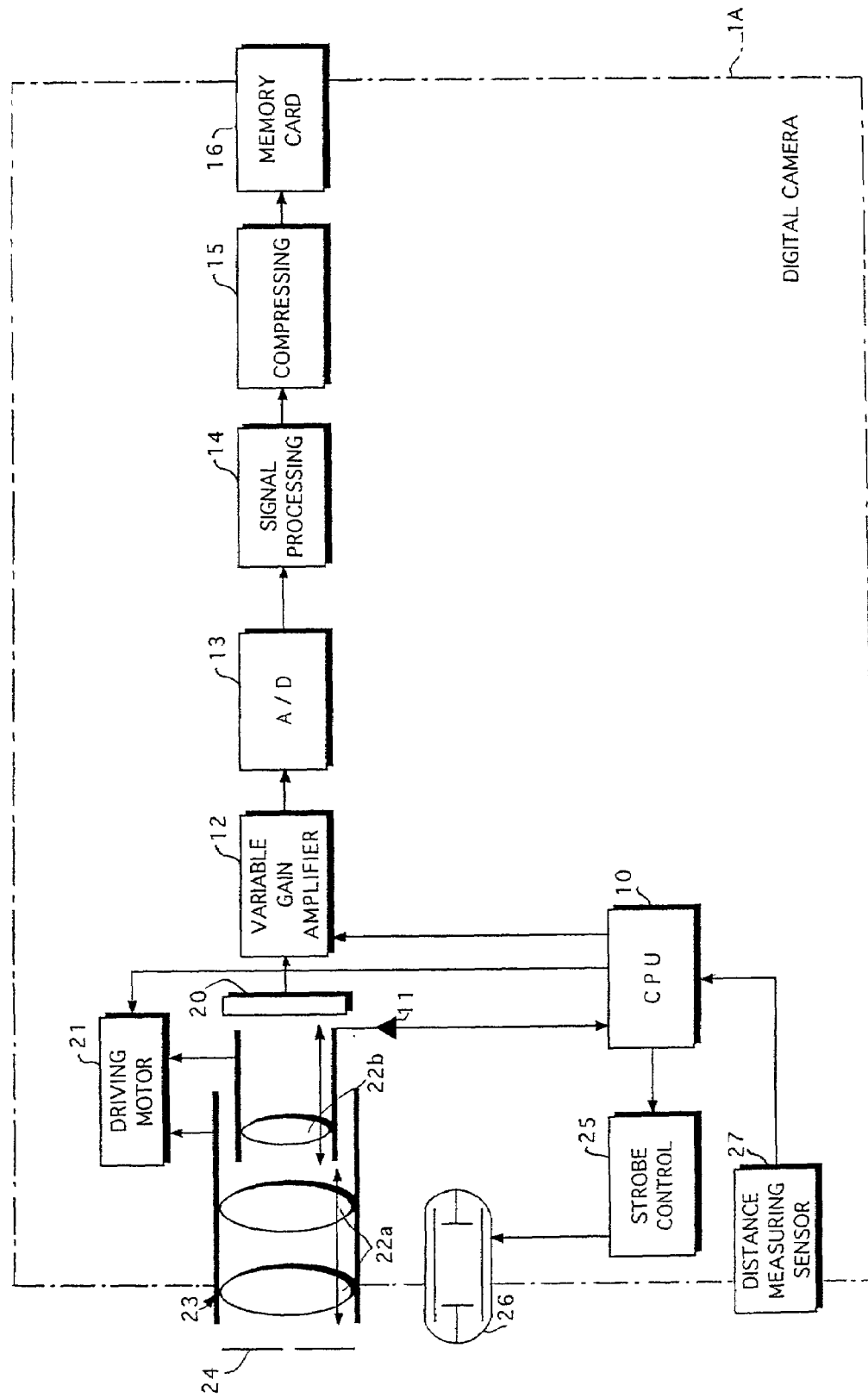
FIG. 3 is a block diagram showing another example of the electrical configuration of a digital camera.

FIG. 3 is a block diagram showing another example of the electrical configuration of a digital camera. A digital camera 1A differs from the digital camera 1 shown in FIG. 1 in that a distance measuring sensor 27 is provided and in that the focus detecting circuit 17 is not provided. The same constituent elements as those shown in FIG. 1 are assigned the same reference numerals and hence, the overlapped description is avoided.

The distance measuring sensor 27 provided in the digital camera 1A measures the distance between the digital camera 1A and a subject. Data representing the distance between the digital camera 1A and the subject is fed to a CPU 10. A focusing lens 22b is put at a focusing position by the CPU 10 on the basis of the distance between the digital camera 1A and the subject. The distance measuring sensor 27 may be one which detects the shift in the position between subject images formed by two lenses to measure the distance, or may utilize trigonometrical measurement to measure the distance.

Figure 4:
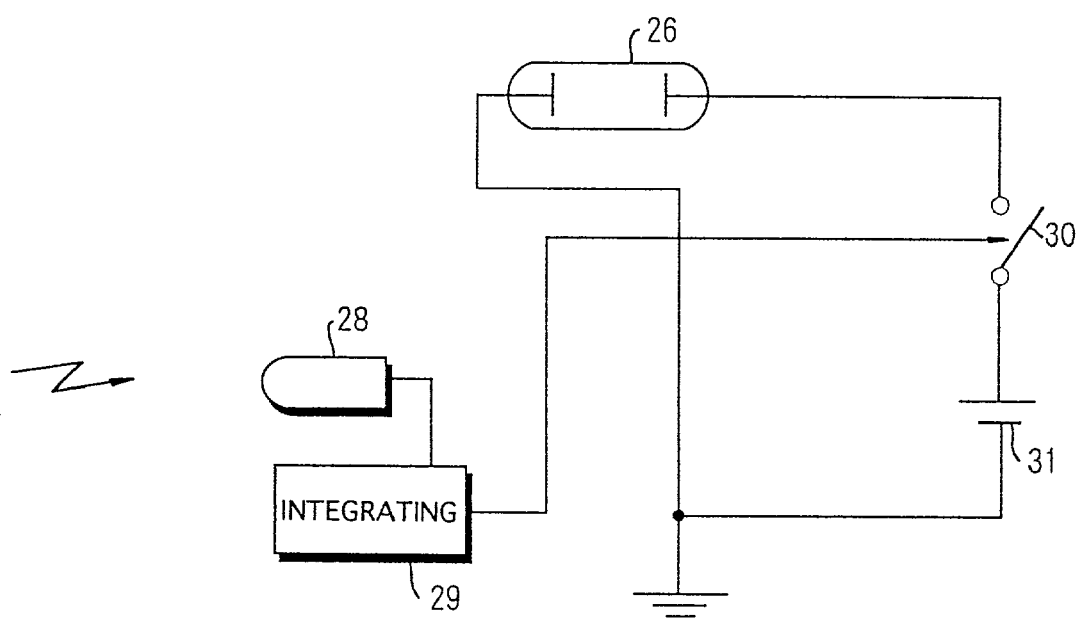
FIG. 4 is a block diagram showing the electrical configuration of a strobe control circuit and a strobe.

FIG. 4 illustrates the details of the electrical configuration of a strobe control circuit 25. The strobe control circuit 25 comprises a light receiving sensor 28, an integrating circuit 29, a switch 30, and a high-voltage power source 31.

Light reflected from the subject is inputted to the light receiving sensor 28. An output signal of the light receiving sensor 28 is inputted to the integrating circuit 29. The switch 30 is subjected to on/off control by the integrating circuit 29.

When the amount of external light incident on the light receiving sensor 28 is insufficient, the switch 30 is turned on, and a strobe 26 is turned on.

Furthermore, a time period during which the switch 30 is turned on is controlled by the integrating circuit 29. A time period during which a voltage supplied to the strobe 26 from the high-voltage power supply 31 is adjusted depending on the time period during which the switch 30 is turned on. Consequently, strobe light irradiated from the strobe 26 is adjusted.

Specifically, when the subject is positioned within a distance at which a predetermined amount of reflected light can be obtained from the subject (hereinafter referred to as an "irradiation distance (or illuminating or lighting distance)") by the strobe light irradiated from the strobe 26, the time period during which the switch 30 is turned on is adjusted such that the predetermined amount of reflected light is obtained. Accordingly, the strobe light irradiated from the strobe 26 is adjusted. As the distance to the subject increases, the time period during which the switch 30 is turned on gradually increases. When the subject is positioned within the irradiation distance by such light adjustment, a subject image having approximately constant brightness can be obtained by imaging.

The amount of the strobe light irradiated from the strobe 26 is indicated by a guide number (Gn) which is inherent for each strobe. The guide number is a fixed (constant) value, and the following equation holds:

$$Gn = F \times d \qquad \text{equation 1}$$

F denotes an f-stop value, and d denotes an irradiation distance (m).

As can be seen from the equation 1, the irradiation distance d of the strobe 26 is changed depending on the guide number Gn of the strobe and the f-stop value F. The larger the guide number Gn is, the longer the irradiation distance d is. The smaller the f-stop value F is, the longer the irradiation distance d is.

Consider a strobe 26 having a guide number Gn of "12", for example. When the f-stop value F is "4", the irradiation distance d is ($12/4=$) 3 m. If the distance to the subject is within 3 m, a predetermined amount of reflected light can be obtained from the subject by strobe light irradiated from the strobe 26, so that a subject image having predetermined brightness (luminance) can be obtained. When the f-stop value F is "8", the irradiation distance d is ($12/8=$) 1.5 m. If the distance to the subject is within 1.5 m, a subject image having predetermined brightness (luminance) can be obtained.

The guide number Gn of the strobe is a fixed value. Accordingly, the irradiation distance d of the strobe 26 can be determined on the basis of the f-stop value F.

Furthermore, in a zoom lens employed for the digital camera, such a relationship that the f-stop value F is increased if the focal distance f thereof is increased holds between the f-stop value F and the focal distance f. The f-stop value F corresponding to the focal distance f can be obtained by simulation using the zoom lens 22a employed in the digital cameras 1 or 1A.

In the digital cameras 1 or 1A comprising the zoom lens 22a, the irradiation distance d of the strobe 26 can be also determined on the basis of the focal distance f of the zoom lens 22a. The irradiation distance d of the strobe 26 is decreased if the focal distance f is increased by moving the zoom lens 22a, while being increased if the focal distance f is decreased.

The irradiation distance d of the strobe 26 is thus calculated on the basis of either the f-stop value F or the focal distance f of the zoom lens 22a.

The brightness of a subject image obtained by imaging can be increased by not only using the strobe 26 but also amplifying an analog image signal.

A variable gain amplifying circuit 12 provided between a CCD 20 and an A/D converter 13 amplifies the inputted analog image signal on the basis of a control instruction from the CPU 10.

When the analog image signal is amplified by the variable gain amplifying circuit 12, photographic sensitivity is increased. Consequently, the subject image represented by the image data is brightened.

When the photographic sensitivity is increased by N times, a distance at which an image having predetermined brightness can be obtained is increased by $N^{1/2}$ times. In a digital camera capable of obtaining an image by photographic sensitivity of ISO 100, for example, when the photographic sensitivity is changed to ISO 200 (the photographic sensitivity is doubled) by increasing the gain of the analog image signal in the variable gain amplifying circuit 12, a distance at which an image having predetermined brightness can be obtained is increased by $2^{1/2}$ times, i.e., 1.41 times.

In a case where the above-mentioned strobe 26 having a guide number Gn of "12" is used, for example, if the photographic sensitivity is doubled, a distance at which a subject image having predetermined brightness can be obtained is 3 m×1.41=4.23 m when the f-stop value F is "4", while being 1.5 m×1.41=2.115 m when the f-stop value F is "8".

The digital cameras 1 or 1A obtain a subject image having predetermined brightness by the strobe light irradiated from the strobe 26 when the subject is positioned within the irradiation distance d of the strobe 26, while obtaining an image signal representing a subject image having predetermined brightness by making an amplification factor for amplifying the image signal higher than usual when the subject is positioned beyond the irradiation distance d of the strobe 26.

Figure 5:
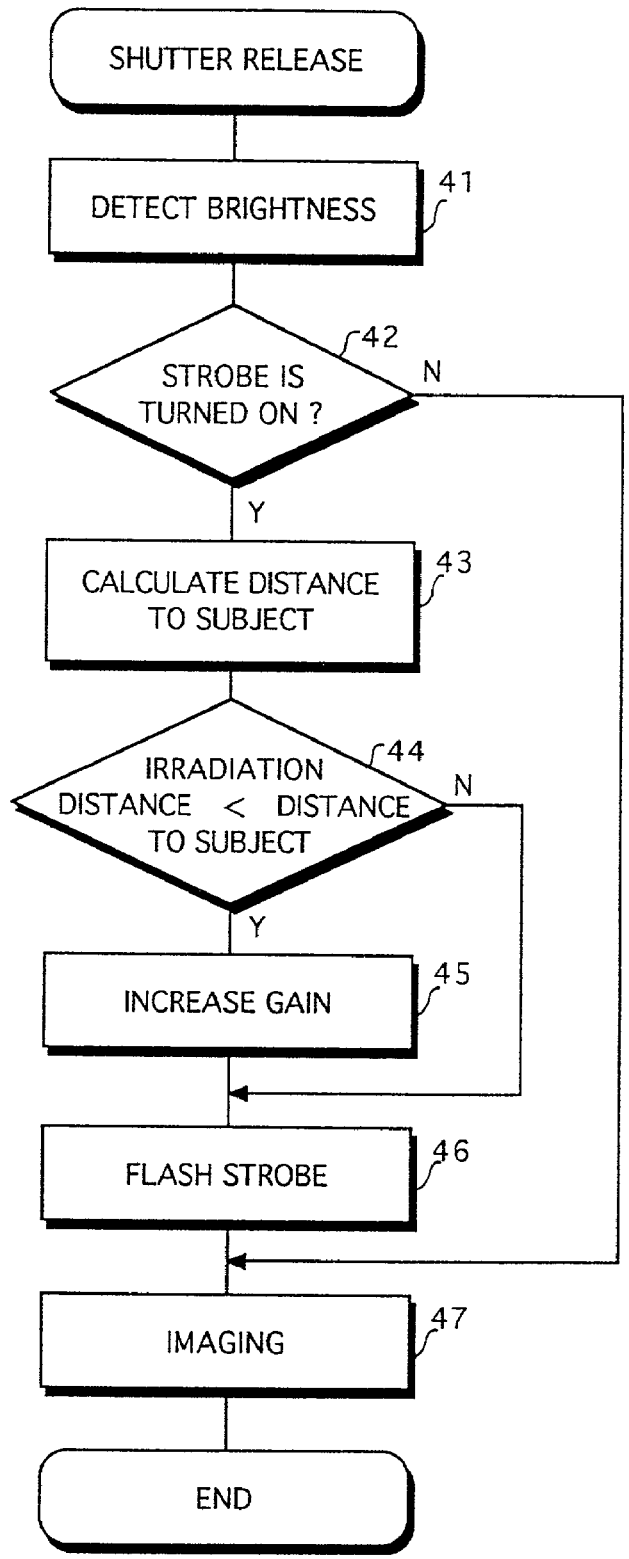
FIG. 5 is a flow chart showing the flow of an operation for imaging a subject by a digital camera.

FIG. 5 is a flow chart showing the flow of operations for imaging by the digital cameras 1 or 1A.

When the shutter release button is depressed by one stage (the first stage), the brightness of a subject is detected by the light receiving sensor 28 in the strobe control circuit 25 on the basis of light incident from the subject (step 41).

When brightness required to obtain a subject image having predetermined brightness is not obtained from external light, the switch 30 is controlled by the integrating circuit 29 such that the strobe 26 is turned on (YES at step 42).

The distance to the subject is calculated (step 43). The distance to the subject may be calculated on the basis of the focusing position of the focusing lens 22b which has been detected from the image signal obtained by the imaging (FIG. 1) or may be calculated by using the dedicated distance measuring sensor (FIG. 3).

The irradiation distance d of the strobe 26 which is obtained by dividing the guide number Gn of the strobe 26 by the f-stop value F and the distance to the subject are compared with each other, to judge whether or not the subject is positioned within the irradiation distance d of the strobe 26 (step 44). The calculation of the irradiation distance d of the strobe 26 and the comparison between the calculated irradiation distance d and the subject are performed by the CPU 10.

When the irradiation distance d of the strobe 26 is shorter than the distance to the subject (YES at step 44), a control instruction from the CPU 10 is inputted to the variable gain amplifying circuit 12. In the variable gain amplifying circuit 12, the gain of the analog image signal inputted from the CCD 20 is made higher than usual (a gain increasing step 45), and the analog image signal whose gain has been increased is inputted to the A/D converter 13.

Figure 6A:
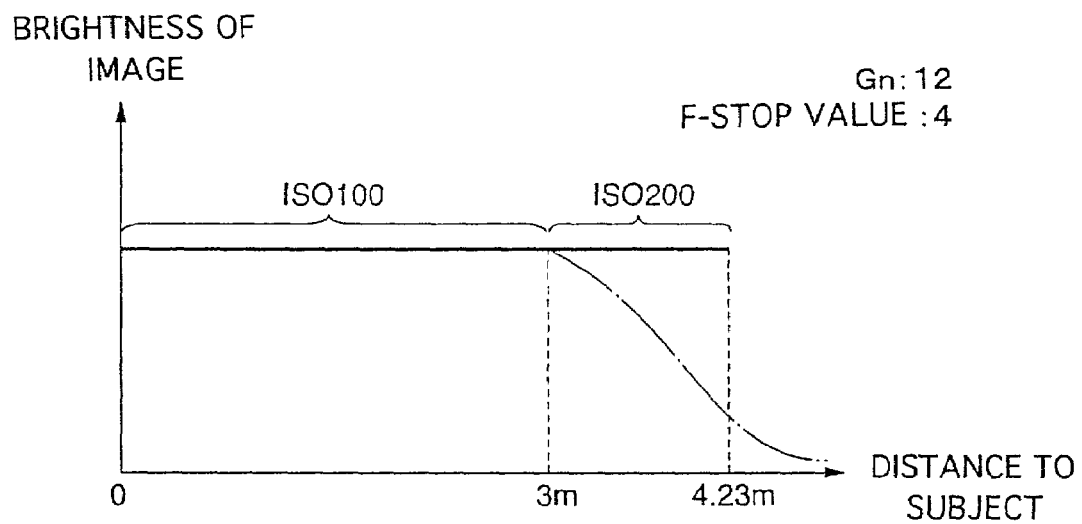
FIG. 6a is a graph showing the relationship between the distance to a subject (the horizontal axis) and the brightness of an obtained image (the vertical axis) in a case where the f-stop value is 4, and 6b is a graph showing the relationship between the distance to a subject (the horizontal axis) and the brightness of an obtained image (the vertical axis) in a case where the f-stop value is 8.
Figure 6B:
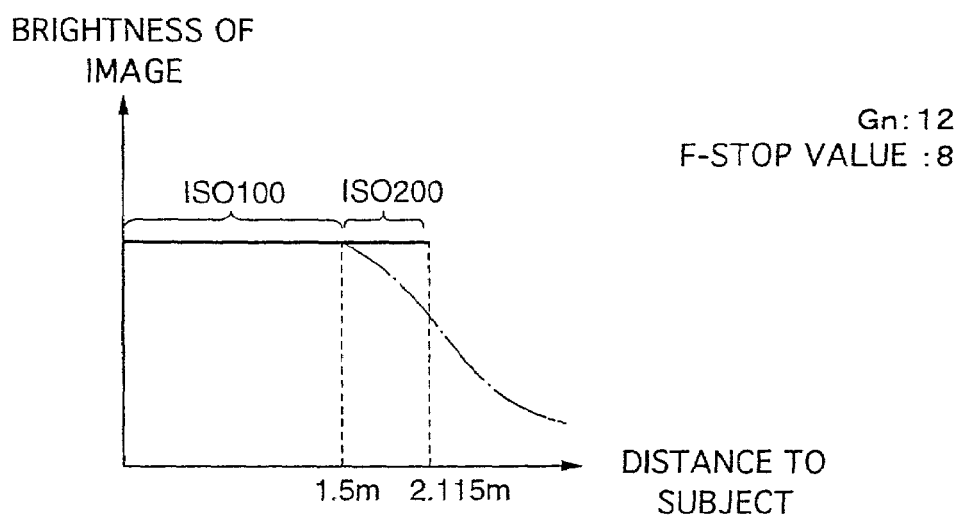

FIGS. 6a and 6b show the relationship between the distance to a subject (the horizontal axis) and the brightness of an obtained image (a subject image) (the vertical axis). FIGS. 6a and 6b respectively show a case where the f-stop value F is "4" and a case where the f-stop value F is "8". FIGS. 6a and 6b respectively illustrate a case where the guide number Gn of the strobe 26 is "12".

When the subject is imaged in a state where the f-stop value F is "4", for example (see FIG. 6a), the irradiation distance d of the strobe 26 is 12/4=3 m from the above-mentioned equation 1. When the distance to the subject exceeds 3 m, therefore, a subject image having predetermined brightness cannot be obtained even if the strobe 26 is caused to emit light in the maximum amount. The brightness of a subject image obtained when the distance to the subject exceeds 3 m is indicated by a one-dot and dash line.

In this case, when the photographic sensitivity is doubled by increasing the gain in the variable gain amplifying circuit 12 (ISO 100 is changed to ISO 200), for example, a distance at which the subject image having predetermined brightness can be obtained is increased to 3 m×1.41=4.23 m, as described above. Even if the subject is positioned beyond a distance of 3 m from the digital camera 1, therefore, a subject image having predetermined brightness can be obtained if it is positioned within a distance of 4.23 m from the digital camera 1.

The gain is increased by the variable gain amplifying circuit 12, so that the obtained subject image is brightened. Also in this case, a time period during which the switch 30 in the strobe control circuit 25 is turned on is adjusted. Consequently, a time period during which a voltage to be supplied to the strobe 26 is applied is controlled. Accordingly, the strobe light from the strobe 26 is adjusted such that a subject image having approximately the same brightness as that in a case where the subject is positioned within the irradiation distance d of the strobe 26 is obtained.

When the subject is imaged in a state where the f-stop value F is "8" (see FIG. 6b), the irradiation distance d of the strobe 26 is 12/8=1.5 m. When the subject is positioned beyond a distance of 1.5 m from the digital camera 1, a subject image having predetermined brightness cannot be obtained. When the photographic sensitivity is doubled by increasing the gain in the variable gain amplifying circuit 12, a distance at which a subject image having predetermined brightness can be obtained is increased to 1.5 m×1.41=2.115 m. When the subject is positioned within a distance of 2.115 m from the digital camera 1, a subject image having predetermined brightness can be obtained.

It goes without saying that the increase in the gain by the variable gain amplifying circuit 12 is not limited to increases in two stages. When the photographic sensitivity is increased by N times by increasing the gain in the variable gain amplifying circuit 12, as described above, the distance at which an image having predetermined brightness can be obtained is increased by $N^{1/2}$ times. Accordingly, a subject image having predetermined brightness can be obtained with respect to a subject positioned in the farther distance by increasing the photographic sensitivity by three times or four times, for example, in the variable gain amplifying circuit 12.

A case where the guide number Gn is "12", and the f-stop value F is "4" (FIG. 6a) is taken as an example. If the variable gain amplifying circuit 12 is so controlled that the gain is increased such that the photographic sensitivity is doubled when the distance to the subject is between 3 m to 4.23 m, while being tripled when it exceeds 4.23 m, a subject image having predetermined brightness can be obtained even if the subject is positioned between 4.23 m and 5.19 m (=3 m×3$^{1/2}$).

It goes without saying that the extent of increase in the gain by the variable gain amplifying circuit 12 is not limited to two times or three times, for example. The extent of increase can be made smaller (for example, 1.2 times or 1.5 times). Consequently, it is possible to keep the degradation of an image produced by increasing the amplification factor in the variable gain amplifying circuit 12 as little as possible.

When the shutter release button is depressed in two stages, light in such an amount that predetermined brightness of an image can be obtained is irradiated onto the subject from the strobe 26 (step 46), so that the subject is imaged (step 47).

When the irradiation distance of the strobe 26 is the same as or longer than the distance to the subject (No at step 44), the gain is not increased. Light in such an amount that predetermined brightness of an image can be obtained is irradiated onto the subject from the strobe 26 (step 46), so that the subject is imaged (step 47).

When brightness required to obtain a subject image having predetermined brightness is obtained by external light, the subject is imaged without using the strobe 26 (No at step 42, and step 47).

Although in the above-mentioned example of operations for imaging by the digital cameras 1 or 1A, the irradiation distance d of the strobe 26 is found on the basis of the f-stop value F, the irradiation distance d of the strobe 26 can be also found on the basis of the focal distance f of the zoom lens 22a, as described above. Accordingly, it is determined whether or not the amplification factor for amplifying the analog image signal is made higher than usual depending on whether or not the subject is positioned within the distance d of the strobe 26 which has been calculated on the basis of the focal distance f of the zoom lens 22a.

Although the present invention has been described and illustrated in detail, it is clearly understood that the same is by way of illustration and example only and is not to be taken by way of limitation, the spirit and scope of the present invention being limited only by the terms of the appended claims.

What is claimed:

1. A digital camera comprising:
    an imaging device for imaging a subject and outputting an image signal representing a subject image obtained by the imaging;
    a zoom lens whose focal distance can be changed;
    a focus lens for focusing;
    a focus detecting circuit for detecting a focusing position of the focus lens on the basis of integration values of the image signal outputted from said imaging device;
    distance measurement means for measuring the distance to the subject on the basis of the focusing position of the focus lens detected by the focus detecting circuit;
    a signal amplifier for amplifying the image signal outputted from said imaging device;
    first judgment means for judging whether or not the irradiation distance of a strobe which is obtained on the basis of the f-stop value of said zoom lens is shorter than the distance to the subject which is measured by said distance measurement means; and
    amplification factor control means for increasing the amplification factor of said signal amplifier when said first judgment means judges that the irradiation distance of the strobe is shorter than the distance to the subject.

2. The digital camera according to claim 1, further comprising
    second judgment means for judging whether or not the subject image represented by the image signal amplified by said signal amplifier whose amplification factor has been increased by said amplification factor control means satisfies predetermined brightness, and
    said amplification factor control means further increasing the amplification factor of said signal amplifier when said second judgment means judges that the subject image represented by the amplified imaging signal does not satisfy predetermined brightness.

3. The digital camera according to claim 1, wherein
    the focus detecting circuit comprises a high-pass filter for extracting a high-frequency signal component from the image signal outputted from the imaging device.

4. The digital camera according to claim 3, wherein
    the focus detecting circuit comprises an integrating circuit for integrating the high-frequency signal component outputted from the high-pass filter for a predetermined time period.

5. The digital camera according to claim 4, wherein
    the focus detecting circuit puts the focus lens at the position where the level of the output data from the integrating circuit reaches the peak valve.

6. In a digital camera for focusing a subject image on a light receiving surface of a solid-state electronic imaging device by a zoom lens whose focal distance can be changed, outputting an image signal representing the subject image from said solid-state electronic imaging device, and amplifying the outputted image signal, a method of controlling the digital camera comprising the steps of:
    detecting a focusing position of a focus lens on the basis of integration values of the image signal output from said imaging device;
    measuring the distance to a subject on the basis of the detected focusing position of the focus lens;
    judging whether or not the irradiation distance of a strobe which is obtained on the basis of the f-stop value of said zoom lens is shorter than the measured distance to the subject; and
    increasing an amplification factor for amplifying the obtained image signal when it is judged that the irradiation distance of the strobe is shorter than the distance to the subject.

* * * * *